United States Patent [19]

Nagamoto et al.

[11] Patent Number: 5,525,692
[45] Date of Patent: Jun. 11, 1996

[54] DEWATERING AGENT FOR SLUDGE

[75] Inventors: Akiyoshi Nagamoto, Yatsushiro gun; Hiroshi Oka, Hatano, both of Japan

[73] Assignee: Kohjin Co., Ltd., Tokyo, Japan

[21] Appl. No.: 307,571

[22] PCT Filed: Jun. 23, 1993

[86] PCT No.: PCT/JP93/00850

§ 371 Date: Dec. 28, 1994

§ 102(e) Date: Dec. 28, 1994

[87] PCT Pub. No.: WO95/00559

PCT Pub. Date: Jan. 5, 1995

[51] Int. Cl.$^6$ .............................. C08F 2/16; C08F 20/60
[52] U.S. Cl. .................. 526/312; 526/304; 526/75; 528/503; 522/174
[58] Field of Search ..................... 526/75, 304, 312; 528/503; 522/174

[56] References Cited

U.S. PATENT DOCUMENTS

| | | | |
|---|---|---|---|
| 4,748,220 | 5/1988 | Hartmann et al. | 526/89 |
| 4,753,738 | 6/1988 | Huang | 210/727 |
| 4,808,668 | 2/1989 | Carioti et al. | 525/329.9 |

FOREIGN PATENT DOCUMENTS

| | | |
|---|---|---|
| 0165770 | 12/1985 | European Pat. Off. . |
| 57-51899 | 3/1982 | Japan . |
| 61-181600 | 8/1986 | Japan . |
| 63-252600 | 10/1988 | Japan . |
| 1-189400 | 7/1989 | Japan . |
| 5117327 | 5/1993 | Japan . |
| 1426897 | 3/1976 | United Kingdom . |

*Primary Examiner*—Mark Nagumo
*Attorney, Agent, or Firm*—Armstrong, Westerman, Hattori, McLeland & Naughton

[57] ABSTRACT

A novel process for preparing an acrylic polymer containing a tertiary amino group which is not quaternized or not salt formed and having a high molecular weight, characterized by reacting an aqueous solution of an acrylic monomer containing a tertiary amino group with carbonic acid gas to generate an acrylic monomer containing a tertiary ammonium carbonate, homopolymerizing the obtained monomer or copolymerizing the obtained monomer with the other vinyl monomer copolymerizable with the obtained monomer to give a polymer containing a structural unit of a tertiary ammonium carbonate, and decarboxylating the polymer with heating and/or reducing the pressure is provided, and particularly, an article containing a water-soluble vinyl polymer which contains at least 5% by mole of the above-mentioned structural unit of a tertiary amino group and whose intrinsic viscosity [η] is at least 1 dl/g is available as an excellent dewatering agent for sludge.

1 Claim, No Drawings

DEWATERING AGENT FOR SLUDGE

TECHNICAL FIELD

The present invention relates to a novel process for preparing an acrylic polymer having a free tertiary amino group which is not quaternized or not salt formed and having a high molecular weight, which has been conventionally difficult to be prepared, and a dewatering agent for sludge using the same.

BACKGROUND ART

Generally, a dewatering agent for sludge, which shows excellent flocculating ability and dewatering ability in a small amount and which is able to be burned up, has been widely used as a flocculant and a dewatering auxiliant against sewage sludge, industrial drainage sludge, and the like.

When an acrylic monomer containing a tertiary amino group is polymerized as it is, since its polymerization does not proceed and a molecular weight does not increase, generally, polymerization has been carried out after the tertiary amino group is quaternized with an alkyl halide and the like or the acrylic monomer is salt formed with a mineral acid and the like.

For instance, as a dewatering agent for sludge, a water-soluble vinyl polymer having a quaternary ammonium group or a tertiary ammonium salt neutralized with a mineral acid and the like has been used. For instance, polymers having an ammonium group quaternized with an alkyl halide such as methyl chloride or ethyl chloride, dimethyl sulfate, diethyl sulfate, and the like are described in Japanese Examined Patent Publication No. 52040/1990, Japanese Examined Patent Publication No. 51141/1988, Japanese Examined Patent Publication No. 48863/1988, Japanese Examined Patent Publication No. 15491/1983, Japanese Unexamined Patent Publication No. 133670/1982, and the like, and a polymer having an ammonium group quaternized with benzyl chloride is described in Japanese Unexamined Patent Publication No. 51899/1982 and the like. Also, in Japanese Examined Patent Publication No. 52040/1990, Japanese Examined Patent Publication No. 15491/1983, Japanese Unexamined Patent Publication No. 49410/1983, Japanese Unexamined Patent Publication No. 47005/1983, Japanese Unexamined Patent Publication No. 133670/1982, and the like, polymers prepared by polymerizing monomers which have been previously salt formed by using a mineral acid such as hydrochloric acid, sulfuric acid or phosphoric acid, or acetic acid are described. However, because the effects of water-soluble vinyl polymers having a quaternary ammonium group or an ammonium group neutralized with a mineral acid and the like are not sufficient for sludge having a difficulty to flocculate and dewater, sludge having a difficulty to flocculate and dewater has been increased in accordance with the high improvement of the treatment for waste water and the like. Then, as a flocculant having excellent dewatering property, which can deal with this increase of sludge, or a flocculant having stable abilities against the change of sludge for the purpose of simplification of working conservation, for instance, it is reported in Japanese Unexamined Patent Publication No. 189400/1989 that a basic substance is added to a cationic polymer whose tertiary amino group is salt formed, and a dewatering agent for sludge made thereof acts as a polymer substantially containing a tertiary amino group. However, a material made by adding a basic substance to a cationic polymer whose tertiary amino group is salt formed does not always show the effects as a polymer containing a tertiary amino group. Moreover, when the neutralization of the material is completely carried out with a basic substance, since the material is changed into a dilute solution of 0.2-% by weight, there was a problem in practicality from the viewpoints of transport, handling and the like.

DISCLOSURE OF INVENTION

In order to develop a dewatering agent for sludge which is excellent in dewatering property against sludge and able to deal with any forms such as powder, aqueous solution and emulsion, the present inventors have earnestly studied in consideration. As a result, by making use of a tertiary ammonium carbonate, a synthesizing method of an acrylic polymer having a tertiary amino group and a high molecular weight, which has been conventionally difficult to be prepared, has been established, and it has been found that the acrylic polymer can be used as a dewatering agent for sludge showing high abilities, then the present invention has been accomplished.

That is, the present invention relates to a process for preparing an acrylic polymer containing a tertiary amino group characterized by containing the steps of reacting an aqueous solution of an acrylic monomer containing a tertiary amino group, represented by the general formula (1) with carbonic acid gas to generate an acrylic monomer containing a tertiary ammonium carbonate, represented by the general formula (2), polymerizing the obtained monomer alone or with the other vinyl monomer copolymerizable with the obtained monomer to give a polymer containing a structural unit of a tertiary ammonium carbonate represented by the general formula (4), and decarboxylating the polymer with heating and/or reducing the pressure to give a polymer containing a structural unit of a tertiary amino group represented by the general formula (3) and having a high molecular weight.

Furthermore, the polymer containing a tertiary amino group and having a high molecular weight, which is obtained by the above-mentioned method, shows stable flocculating property and excellent dewatering property against sludge in a small addition, and especially, an article containing a water-soluble vinyl polymer which contains at least 5% by mole of a structural unit represented by the general formula (3) and whose intrinsic viscosity [η] is at least 1 dl/g is suitable as a dewatering agent for sludge, and the present invention also relates to a dewatering agent for sludge.

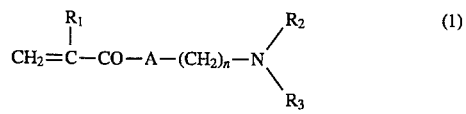

wherein $R_1$ is hydrogen or methyl group, $R_2$ and $R_3$ are lower alkyl groups of $C_1$–$C_4$, n is an integer of 2–4, —A— is —O— or —NH—.

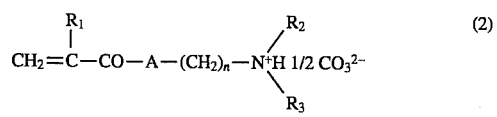

wherein $R_1$ is hydrogen or methyl group, $R_2$ and $R_3$ are lower alkyl groups of $C_1$–$C_4$, n is an integer of 2–4, —A— is —O— or —NH—.

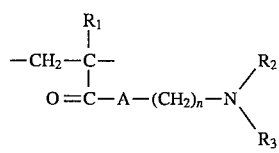

(3)

wherein $R_1$ is hydrogen atom or methyl group, $R_2$ and $R_3$ are alkyl groups of $C_1$–$C_4$, n is an integer of 2–4, —A— is —O— or —NH—.

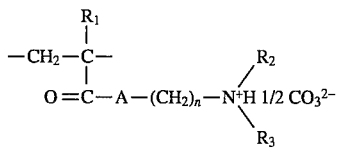

(4)

wherein $R_1$ is hydrogen atom or methyl group, $R_2$ and $R_3$ are alkyl groups of $C_1$–$C_4$, n is an integer of 2–4, —A— is —O— or —NH—.

As the acrylic monomer represented by the general formula (1) used in the present invention,
N,N-dimethylaminopropyl(meth)acrylamide,
N,N-diethylaminopropyl(meth)acrylamide,
N,N-dimethylaminobutyl(meth)acrylamide,
N,N-diethylaminobutyl(meth)acrylamide,
N,N-dimethylaminoethyl(meth)acrylate,
N,N-diethylaminoethyl(meth)acrylate,
N,N-methylethylaminopropyl(meth)acrylamide,
N,N-methylethylaminoethyl(meth)acrylate, and the like are exemplified.

Also, the acrylic monomer containing a tertiary ammonium carbonate, represented by the general formula (2) is synthesized by reacting an aqueous solution of an acrylic monomer containing a tertiary amino group, represented by the general formula (1) with carbonic acid gas under ordinary pressure or under pressure, preferably under pressure. At that time, it is preferable that the reaction temperature is low because solubility of carbonic acid gas is heightened. Concretely, it is preferable that the reaction temperature is at most 20° C. Also, in order to prevent the acrylic monomer containing a tertiary amino group from polymerizing during its reaction, it is desired that the system is shielded from light and a polymerization inhibitor is added to the system.

By a known radical polymerization treatment, the obtained acrylic monomer containing a tertiary ammonium carbonate can be easily polymerized alone or with the other vinyl monomer copolymerizable with the obtained acrylic monomer to prepare a water-soluble polymer containing a structural unit represented by the general formula (4).

Also, as the vinyl monomer copolymerizable with the above-mentioned monomer represented by the general formula (2), there is no particular limitation, and for instance, a quaternized salt and a neutralized salt of the acrylic monomer represented by the general formula (1), (meth)acrylamide, N-isopropylacrylamide, N-methylacrylamide, dimethylamino(meth)acrylamide, various (meth)acrylates, (meth)acrylic acid, acrylonitrile, and the like are exemplified.

By decarboxylating the obtained polymer having a structural unit of carbonate represented by the general formula (4) under the pressure of at most 1 atom at the temperature of from ordinary temperature to 100° C., the structural unit of carbonate can be changed to a tertiary amino group, so that a water-soluble polymer containing a structural unit of a free tertiary amino group represented by the general formula (3) can be obtained.

For instance, when the thus obtained acrylic polymer containing a tertiary amino group is used in a dewatering auxilant for sludge as a flocculant, the acrylic polymer shows characteristics, which have not been conventionally known such that the obtained acrylic polymer shows a higher dewatering percentage in comparison with a conventionally used quaternary salt type or tertiary salt type cationic polymer, and shows stable abilities in a wide range of the amount added, that the most suitable amount added of the obtained acrylic polymer is less than that of a conventional vinyl polymer containing a strong anion as a counter ion, and that the obtained acrylic polymer has excellent peeling property of a cake from a filter cloth.

At this time, when the structural unit represented by the above-mentioned general formula (3) and/or the general formula (4) contained in the polymer is less than 5% by mole, since excellent flocculating ability is not sufficient, it is preferable that at least 5% by mole of the structural unit is contained, and in order to stably reveal excellent abilities, it is preferable that at least 10% by mole of the structural unit is contained. Also, when the intrinsic viscosity [η] of the polymer is less than 1, since sufficient flocculating ability is not obtained, it is preferable that the intrinsic viscosity [η] is at least 1.

BEST MODE FOR CARRYING OUT THE INVENTION

The present invention is specifically explained by means of the following Examples.

In Examples and Comparative Examples described below, flocculating ability was evaluated in accordance with the following criteria and its results were shown in Table 1 or Table 2.

Using city sewage digested sludge having solid matter of 1.0% by weight and pH of 7.3, after each 0.2% by weight aqueous solution of the polymer obtained in Examples 2–9 and Comparative Examples 1–4 was added to the city sewage digested sludge so that the amount of the polymer was 0.3–2.0% by weight based upon the solid matter, and they were stirred at 200 rpm for 30 seconds by means of a jar tester, the dewatering rate of the sludge measured by means of a CST (capillary suction time) evaluation apparatus is shown in Table 1, and also, the moisture content of the cake and the peeling property of the cake from a filter cloth measured by means of a simplified belt press dewatering apparatus were shown in Table 2.

At this time, with respect to the evaluation of the peeling property of the cake from the filter cloth, a mark of ○ means that the cake did not adhere to the filter cloth, a mark of Δ means that the cake slightly adhered to the filter cloth and a mark of X means that the cake considerably adhered to the filter cloth.

EXAMPLE 1 (SYNTHESIS OF CARBONATE MONOMER)

To a 1 L glass autoclave equipped with a thermometer, a pressure gauge and a tube for introducing carbonic acid gas, 281.2 g of N, N-dimethylaminopropylacrylamide (hereinafter referred to as DMAPAA), 240.8 g of pure water and 0.7 g of p-methoxyphenol as a polymerization inhibitor were added, and carbonic acid gas was provided thereto with stirring at 0° C. under a pressure of 2 kg/cm² in a shielded state from light. After reacted for 24 hours, 563 g of 60% by weight aqueous solution of DMAPAA carbonate was obtained. From the change of weight between before and after the reaction (522.7 g→563.0 g) and the change of pH of reaction solution from pH 13 to pH 8, it is judged that the DMAPAA carbonate was produced.

EXAMPLE 2

To 60 g of 60% by weight aqueous solution of DMAPAA carbonate, 0.03% by weight of benzyl dimethyl ketal and 0.01% by weight of EDTA-2Na were added. The obtained mixture was added to a 500 ml three-necked separable flask equipped with a temperature sensor, a tube for introducing gas and an exhaust pipe. While carbonic acid gas was flowed into the flask, light was irradiated thereto from the bottom of the flask using a low-pressure mercury lamp of 1 w/m$^2$ strength until the polymerization temperature attained to its peak.

Next, the polymerization was carried out by irradiating light by means of a high-pressure mercury lamp of 50 w/m$^2$ strength for 3 minutes to give DMAPAA carbonate polymer. When the intrinsic viscosity [η] of a 1N NaCl aqueous solution of the obtained polymer was measured at 25° C., it was 3.7 (dl/g). Also, the flocculating ability was evaluated. The results were shown in Table 1 and Table 2.

EXAMPLE 3

The polymer obtained in Example 2 was decarboxylated at 40° C. to give DMAPAA polymer having a tertiary amino group. When the intrinsic viscosity [η] of a 1N NaCl aqueous solution of the obtained polymer was measured at 25° C., it was 3.6 (dl/g). Also, the flocculating ability was evaluated. The results were shown in Table 1 and Table 2.

EXAMPLE 4

The treatment of the polymerization was carried out in the same manner as in Example 2 except that benzyl dimethyl ketal was changed to 0.10% by weight and EDTA-2Na was changed to 0.03% by weight in the conditions of Example 2, and then, decarboxylation was carried out in the same manner as in Example 3 to give DMAPAA polymer. When the intrinsic viscosity [η] of a 1N NaCl aqueous solution of the obtained polymer was measured at 25° C., it was 1.2 (dl/g). Also, the flocculating ability was evaluated. The results were shown in Table 1 and Table 2.

EXAMPLE 5

To 11 g of 60% by weight aqueous solution of DMAPAA carbonate, 36.8 g of 80% by weight aqueous solution of N,N-dimethylaminoethyl methacrylate methyl chloride quaternary ammonium salt (hereinafter referred to as DM-C) (DMAPAA carbonate: DM-C=2:8 (molar ratio)) and 12.2 g of pure water were added, and the polymerization was carried out in the same manner as in Example 2, and decarboxylation was carried out in the same manner as in Example 3 to give DMAPAA/DM-C copolymer polymer. When DM-C in the obtained polymer was analyzed by means of a quaternary ammonium salt measuring method, the quaternary ammonium salt value was 84%, and thereby the molar ratio of DMAPAA: DM-C of the present polymer was calculated to about 2:8. Also, when the intrinsic viscosity [η] of a 1N NaCl aqueous solution of the present polymer was measured at 25° C., it was 4.5 (dl/g). Also, the flocculating ability was evaluated. The results were shown in Table 1 and Table 2.

EXAMPLE 6

To 41.2 g of 60% by weight aqueous solution of DMAPAA carbonate, 18.8 g of 50% by weight aqueous solution of acrylamide (hereinafter referred to as AAm) (DMAPAA carbonate: AAm=1:1 molar ratio) was added, the polymerization was carried out in the same manner as in Example 2, and decarboxylation was carried out in the same manner as in Example 3 to give DMAPAA/AAm copolymer polymer. The present polymer was analyzed by colloidal titration, and as a result, the degree of cationization was 69% and the molar ratio of DMAPAA:AAm was about 1:1. When the intrinsic viscosity [η] of a 1N NaCl aqueous solution of the obtained polymer was measured at 25° C., it was 6.7 (dl/g). Also, the flocculating ability was evaluated. The results were shown in Table 1 and Table 2.

EXAMPLE 7

Twenty six g of 60% by weight aqueous solution of DMAPAA polymer obtained in Example 3 and 14.2 g of 50% by weight aqueous solution of acrylamide polymer whose [η] was 9.7 (dl/g) were blended with stirring (DMAPAA polymer: AAm polymer=1:1 (molar ratio)). Also, the flocculating ability was evaluated. The results were shown in Table 1 and Table 2.

EXAMPLE 8

Sixty g of 60% by weight aqueous solution of N,N-dimethylaminopropyl(meth)acrylamide carbonate (hereinafter referred to as DMAPMA carbonate) was polymerized in the same manner as in Example 2 and treated in the same manner as in Example 3 to give DMAPMA polymer. When the intrinsic viscosity [η] of a 1N NaCl aqueous solution of the obtained polymer was measured at 25° C., it was 3.4 (dl/g). Also, the flocculating ability was evaluated. The results were shown in Table 1 and Table 2.

EXAMPLE 9

Sixty g of 60% by weight aqueous solution of N,N-dimethylaminoethylacrylamide carbonate (hereinafter referred to as DMAEAA carbonate) was polymerized in the same manner as in Example 2 and treated in the same manner as in Example 3 to give DMAEAA polymer. When the intrinsic viscosity [η] of a 1N NaCl aqueous solution of the obtained polymer was measured at 25° C., it was 3.5 (dl/g). Also, the flocculating ability was evaluated. The results were shown in Table 1 and Table 2.

COMPARATIVE EXAMPLE 1

To a 500 ml three-necked separable flask equipped with a temperature sensor, a tube for introducing gas and an exhaust pipe, 60 g of 60% by weight aqueous solution of DMAPAA was added. Light was irradiated thereto from the bottom of the flask by means of a low-pressure mercury lamp of 1 w/m$^2$ strength while carbonic acid gas was flowed thereto. Then, the polymerization was carried out by irradiating light by means of a high-pressure mercury lamp of 50 w/m$^2$ strength for 3 minutes. The content was in starch syrup-like state having fluidity. When the intrinsic viscosity [η] of a 1N NaCl aqueous solution of the obtained polymer was measured at 25° C., it was 0.01 (dl/g). Also, the flocculating ability was evaluated. The results were shown in Table 1 and Table 2.

COMPARATIVE EXAMPLES 2–4

The polymerization was carried out in the same manner as in Example 2 to give polymers except that each of 60 g of 50% by weight aqueous solution of DMAPAA sulfate, 60 g of 50% by weight aqueous solution of N,N-dimethylaminoethyl acrylate methyl chloride quaternary salt (hereinafter referred to as DMAEA-Q) and 60 g of 50% by weight aqueous solution of DM-C was used instead of DMAPAA carbonate in Example 2. When each intrinsic viscosity [η] of 1N NaCl aqueous solutions of the obtained polymers was measured at 25° C., the intrinsic viscosity of DMAPAA sulfate polymer was 4.1, that of DMAEA-Q polymer was 8.3 and that of DM-C polymer solution was 7.7 (dl/c). Also, the flocculating ability was evaluated. The results were shown in Table 1 and Table 2.

EXAMPLE 10

(Polymerization, and synthesis of a polymer containing a tertiary amino group)

To a 500 ml three-necked separable flask equipped with a thermometer, a tube for introducing gas and an exhaust pipe, 100 g of 60% by weight aqueous solution of DMAPAA carbonate obtained in the same manner as in Example 1 was added. While carbonic acid gas was bubbled to the flask in a constant temperature bath of 20° C., 0.6 ml of 1% by weight aqueous solution of 2,2-azobis[2-(2-imidazolin-2-yl)propane] dihydrochloride as a polymerization initiator was added to the flask, and the polymerization was carried out. A free DMAPAA polymer having a tertiary amino group was obtained by drying under a pressure of 50 mmHg at 40° C. for 12 hours and decarboxylating the obtained aqueous polymer solution. When the intrinsic viscosity [η] of a 1N NaCl aqueous solution of the polymer was measured at 25° C., it was 5.2 dl/g.

EXAMPLE 11

To 91.3 g of 60% by weight aqueous solution of DMAPAA carbonate obtained in the same manner as in Example 1 (synthesis of carbonate), 5.2 g of acrylamide (DMAPAA carbonate: acrylamide=8:2 molar ratio) and 3.5 g of pure water were added. The polymerization, and decarboxylating and drying were carried out in the same manner as in Examples 1-2 (polymerization, and synthesis of a polymer containing a tertiary amino group) to give a copolymer polymer. When the intrinsic viscosity of a 1N NaCl aqueous solution of the obtained polymer was measured at 25° C., it was 6.1.

EXAMPLE 12

(Synthesis of Carbonate)

To a 1 L glass autoclave equipped with a thermometer, a pressure gauge and a tube for introducing carbonic acid gas, 282.6 g of N,N-dimethylaminoethyl methacrylate (hereinafter referred to as DMAEMA), 242.2 g of pure water and 0.7 g of p-methoxyphenol were added, and carbonic acid gas was provided thereto with stirring at 0° C. under a pressure of 2 kg/cm$^2$ in a shielded state from light. After reacted for 24 hours, 565 g of 60% by weight aqueous solution of DMAEMA carbonate was obtained. To a 500 ml three-necked separable flask equipped with a thermometer, a tube for introducing gas and an exhaust pipe, 100 g of the obtained 60% by weight aqueous solution of DMAEMA carbonate was added. While carbonic acid gas was bubbled to the flask in a constant temperature bath of 20° C., 0.6 ml of 1% by weight aqueous solution of 2,2-azobis[2-(2-imidazolin-2-yl)-propane] dihydrochloride was added to the flask, and the polymerization was carried out. A free DMAEMA polymer having a tertiary amino group was obtained by drying under a pressure of 50 mmHg at 40° C. for 12 hours and decarboxylating the obtained aqueous polymer solution. When the intrinsic viscosity [η] of a 1N NaCl aqueous solution of the polymer was measured at 25° C., it was 5.8.

From the results shown in Table 1, flocculating and dewatering ability of a conventional acrylic polymer having a strong anion as a counter ion was sharply lowered around the most suitable amount thereof added to the sludge. On the contrary, the acrylic polymer containing a tertiary amino group synthesized by homopolymerization or copolymerization according to the present invention showed high dewatering percentage and stable ability in a wide range of the amount added of the polymer. Also, the most suitable amount added of the polymer was less than that of the conventional acrylic polymer having a strong anion as a counter ion, and the peeling property of the cake from a filter cloth was excellent.

Industrial Applicability

An acrylic polymer containing a free tertiary amino group, obtained by the present invention has a high molecular weight, and when the acrylic polymer is used as a dewatering agent for sludge, the dewatering agent for sludge of the acrylic polymer containing a free tertiary amino group is effective in a smaller amount added in comparison with a conventional dewatering agent for sludge of an acrylic polymer containing a strong anionic counter ion, and shows excellent abilities such that abilities are stable against the change of the concentration of the sludge and that high dewatering percentage is exhibited, so that it is expected that the dewatering agent can greatly lower the cost of treatment for sludge. Accordingly, the dewatering agent for sludge provided by the present invention shows excellent availability for sludge having a difficulty to dewater or the like, which is generated in water treatment places of large cities.

TABLE 1

Evaluation Results of flocculating and dewatering ability of digested sludge by various acrylic polymers

[Table 1]

| | Components of acrylic polymer | | CST value (second) Amount added of the polymer | | | | |
|---|---|---|---|---|---|---|---|
| | Components of monomer (molar ratio) | [η] | (% by weight) | | | | |
| | | | 0.3 | 0.5 | 1.0 | 1.5 | 2.0 |
| Example 2 | DMAPAA carbonate | 3.7 | 9.2 | 8.1 | 8.6 | 10.1 | 11.8 |
| Example 3 | DMAPAA | 3.6 | 9.0 | 7.9 | 8.4 | 9.8 | 11.9 |
| Example 4 | DMAPAA | 1.2 | 11.1 | 10.7 | 11.5 | 12.3 | 13.7 |
| Example 5 | DMAPAA/DM—C = 2/8 | 4.5 | 15.2 | 13.7 | 9.3 | 11.7 | 17.4 |
| Example 6 | DMAPAA/AAm = 1/1 | 6.7 | 17.9 | 10.0 | 10.9 | 19.7 | 33.9 |
| Example 7 | DMAPAA/AAm = 1/1 | — | 22.1 | 15.0 | 18.0 | 24.3 | — |
| Example 8 | DMAPMA | 3.4 | 10.2 | 10.0 | 10.4 | 11.5 | 12.3 |
| Example 9 | DMAEAA | 3.5 | 9.2 | 8.2 | 8.7 | 10.1 | 12.1 |
| Comparative Example 1 | DMAPAA | 0.01 | 68 | 37 | 44 | 72 | — |
| Comparative Example 2 | DMAPAA sulfate | 4.1 | 22.8 | 15.8 | 12.6 | 30.2 | — |

TABLE 1-continued

Evaluation Results of flocculating and dewatering ability of digested sludge by various acrylic polymers

| | | | | | | | |
|---|---|---|---|---|---|---|---|
| Comparative Example 3 | DMAEA—Q | 8.3 | — | 53.0 | 42.3 | 20.8 | 27.3 |
| Comparative Example 4 | DM—C | 7.7 | — | — | 36.1 | 15.8 | 23.4 |

[Table 2]

| | Moisture content of the cake (%) Amount added of the polymer (% by weight) | | | | | Peeling property of the cake from the filter cloth Amount added of the polymer (% by weight) | | | | |
|---|---|---|---|---|---|---|---|---|---|---|
| | 0.3 | 0.5 | 1.0 | 1.5 | 2.0 | 0.3 | 0.5 | 1.0 | 1.5 | 2.0 |
| Example 2 | 74.2 | 73.2 | 73.8 | 74.5 | 74.9 | ◯ | ◯ | ◯ | ◯ | ◯ |
| Example 3 | 74.0 | 73.1 | 73.8 | 74.0 | 75.0 | ◯ | ◯ | ◯ | ◯ | ◯ |
| Example 4 | 74.7 | 74.4 | 74.7 | 75.2 | 75.6 | ◯ | ◯ | ◯ | ◯ | ◯ |
| Example 5 | 75.3 | 75.1 | 74.5 | 74.8 | 77.8 | ◯ | ◯ | ◯ | ◯ | △ |
| Example 6 | 77.5 | 74.2 | 74.4 | 77.1 | 79.0 | △ | ◯ | ◯ | ◯ | △ |
| Example 7 | 78.4 | 75.7 | 77.3 | 78.6 | — | △ | ◯ | △ | △ | — |
| Example 8 | 74.8 | 74.0 | 74.9 | 75.4 | 75.9 | ◯ | ◯ | ◯ | ◯ | ◯ |
| Example 9 | 74.2 | 73.3 | 74.0 | 74.2 | 75.3 | ◯ | ◯ | ◯ | ◯ | ◯ |
| Comparative Example 1 | — | — | — | — | — | — | — | — | — | — |
| Comparative Example 2 | 78.2 | 76.0 | 75.3 | 79.1 | — | △ | △ | ◯ | △ | — |
| Comparative Example 3 | — | 82.3 | 81.1 | 78.0 | 79.3 | — | X | X | △ | X |
| Comparative Example 4 | — | — | 79.7 | 77.6 | 78.3 | — | — | X | △ | X |

We claim:

1. A process for preparing an acrylic polymer containing a structural unit of a tertiary amino group represented by the structural formula (3):

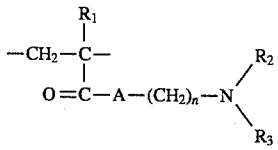

(3)

wherein $R_1$ is hydrogen atom or methyl group, $R_2$ and $R_3$ are lower alkyl groups of $C_1$–$C_4$, n is an integer of 2–4, —A— is —O— or —NH—, characterized by reacting an aqueous solution of an acrylic monomer containing a tertiary amino group, represented by the general formula (1):

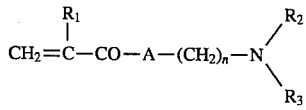

(1)

wherein $R_1$ is hydrogen atom or methyl group, $R_2$ and $R_3$ are lower alkyl groups of $C_1$–$C_4$, n is an integer of 2–4, —A— is —O— or —NH—, with carbonic acid gas to generate an acrylic monomer containing a tertiary ammonium carbonate, represented by the general formula (2):

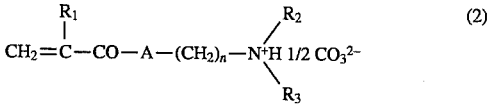

(2)

wherein $R_1$ is hydrogen atom or methyl group, $R_2$ and $R_3$ are lower alkyl groups of $C_1$–$C_4$, n is an integer of 2–4, —A— is —O— or —NH—, homopolymerizing the obtained acrylic monomer or copolymerizing the obtained acrylic monomer with a vinyl monomer copolymerizable with the acrylic monomer to give a polymer containing a structural unit of a tertiary ammonium carbonate represented by the general formula (4):

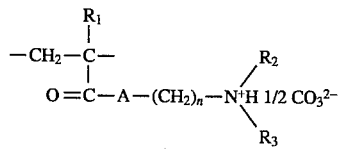

(4)

wherein $R_1$ is hydrogen atom or methyl group, $R_2$ and $R_3$ are lower alkyl groups of $C_1$–$C_4$, n is an integer of 2–4, —A— is —O— or —NH—, and decarboxylating said polymer with heating and/or reducing the pressure.

* * * * *